(12) United States Patent
Park et al.

(10) Patent No.: US 7,008,608 B2
(45) Date of Patent: Mar. 7, 2006

(54) LI-CO-MN OXIDE AS CATHODE MATERIAL FOR LITHIUM BATTERIES AND METHOD OF SYNTHESIS OF THE SAME

(75) Inventors: Yong Joon Park, Daejeon (KR); Young Sik Hong, Daejeon (KR); Xianglan Wu, Daejeon (KR); Kwang Man Kim, Daejeon (KR); Young Gi Lee, Daejeon (KR); Kwang Sun Ryu, Deajeon (KR); Soon Ho Chang, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 0 days.

(21) Appl. No.: 10/740,885

(22) Filed: Dec. 17, 2003

(65) Prior Publication Data

US 2004/0228791 A1 Nov. 18, 2004

(30) Foreign Application Priority Data

May 7, 2003 (KR) ...................... 10-2003-0028867

(51) Int. Cl.
- *C01D 1/02* (2006.01)
- *C01G 51/04* (2006.01)
- *C01G 45/02* (2006.01)
- *H01M 4/50* (2006.01)
- *H01M 4/58* (2006.01)

(52) U.S. Cl. ............................... 423/594.6; 423/594.5; 423/599; 423/594.15; 429/224; 429/231.3; 429/231.95

(58) Field of Classification Search ............. 423/594.5, 423/599, 594.6, 594.15; 429/224, 231.3, 429/231.95

See application file for complete search history.

(56) References Cited

U.S. PATENT DOCUMENTS

| 5,244,757 | A | * | 9/1993 | Takami et al. ............... 429/336 |
| 5,789,112 | A | * | 8/1998 | Ellgen ......................... 429/223 |
| 6,080,510 | A | * | 6/2000 | Hemmer et al. ............. 429/224 |
| 6,103,422 | A | * | 8/2000 | Kanai ........................ 429/224 |
| 6,383,235 | B1 | * | 5/2002 | Maegawa et al. .......... 29/623.5 |

(Continued)

FOREIGN PATENT DOCUMENTS

JP 08-273665 10/1996

(Continued)

OTHER PUBLICATIONS

Koichi Numata, Chie Sakaki, Shoji Yamanaka, "Synthesis and characterization of layer structured solid solutions in the system of $LiCoO_2$-$Li_2MnO_3$", Solid State Ionics 117 (1999), pp. 257-263.

*Primary Examiner*—Stanley S. Silverman
*Assistant Examiner*—Jonas N. Strickland
(74) *Attorney, Agent, or Firm*—Blakely, Sokoloff, Taylor & Zafman (57) ABSTRACT

Provided is a lithium-cobalt-manganese oxide having the formula $Li[Co_xLi_{(1/3-x/3)}Mn_{(2/3-2x/3)}]O_2 (0.05<X<0.9)$ which provide a stable structure and a superior discharge capacity, and the method of synthesizing of the same. The method of synthesizing the oxides according to the present invention comprises: preparing an aqueous solution of lithium salt, cobalt salt, and manganese salt; forming a gel by burning the aqueous solution; making oxide powder by burning the gel; forming a fine oxide powder having a layered structure by the twice of treatments. The lithium-cobalt-manganese oxide synthesized according to the present invention has a stable and superior electrochemical characteristic. The oxide is synthesized by simple and low cost heat treatment process.

10 Claims, 7 Drawing Sheets

U.S. PATENT DOCUMENTS 6,428,766 B1 * 8/2002 Fujino et al. ............... 423/599
6,551,571 B1 * 4/2003 Fujino et al. ............... 423/599

FOREIGN PATENT DOCUMENTS

| KR | P1998-018644 | 6/1998 |
|----|--------------|--------|
| KR | P1999-0052170 | 7/1999 |
| KR | P2000-0029333 | 5/2000 |
| KR | P2002-0016477 | 3/2002 |
| KR | P2002-0045052 | 6/2002 |

* cited by examiner

LI-CO-MN OXIDE AS CATHODE MATERIAL FOR LITHIUM BATTERIES AND METHOD OF SYNTHESIS OF THE SAME

This application claims the priority of Korean Patent Application No. 2003-28867 filed on May 7, 2003 in the Korean Intellectual Property Office, the disclosure of which is incorporated herein in its entirety by reference.

BACKGROUND OF THE INVENTION

1. Field of the Invention

The present invention relates to a cathode material for a lithium secondary batteries, and more particularly, to a lithium-cobalt-manganese oxides having a layered structure providing a superior structural safety and a high discharge capacity, and the synthesis of the same.

2. Description of the Related Art

Presently, one of a typical commercialized cathode material for the lithium secondary batteries is the lithium-cobalt oxide ($LiCoO_2$). With its high discharge voltage high discharge capacity of 140~160 mAh/g, and the characteristics of stable recharge and discharge ability, the lithium-cobalt oxide is used in most commercial secondary lithium batteries. However, since the lithium-cobalt oxide can cause environmental contamination and its high cost, many researches have been endeavored to find a substitute material for this electrode.

Another cathode material for the lithium secondary batteries according to the conventional art includes a lithium-nickel oxide ($LiNiO_2$) and a lithium-manganese oxide ($LiMn_2O_4$). The lithium-nickel oxide has the advantage of low raw material cost and a large usable voltage capacity, which is in the range of 160~180 mAh/g depending on the synthesis method, but it has been known that there is a chemical reaction between the lithium-nickel oxide and the electrolyte occurs when discharge/recharge is repeated consecutively, which can cause a safety problem. The lithium-manganese oxide, however, owing to the low discharge capacity compare to other cathode materials and its lower conductivity, is seldom used for commercial purposes.

The researches regarding the lithium-cobalt-manganese oxides have been performed toward improving the characteristic of recharge/discharge by partial substitution of the cobalt ion in the spinel structured $LiMn_2O_4$ (Refer to the Korean Patent No. 2002-0016477). However, the lithium-cobalt-manganese oxides based on $LiMn_2O_4$ have the discharge capacity of 120~130 mAh/g or less, which is almost the same discharge capacity of the $LiMn_2O_4$ or even lower.

Recently, there have been studies to develop a cathode material using the solid solution of the $LiCoO_2$ and Mn group oxides ($LiMnO_2$ or $Li_2MnO_3$) having a stable layered structure. Especially, K. Numata et al. have synthesized $LiCoO_2$ and $Li_2MnO_3$, and reported the characteristic of the oxide solid solution of the same (Refer to the Solid State Ionics 117(1999) 257–263). Here, under the assumption that the oxidation state of Co is 3+, Li is 1+, and Mn is 4+, a compound having following formula can be formed: $Li[Co_xLi_{(1/3-x/3)}Mn_{(2/3-2x/3)}]O_2$. However, in this formula $Li[Co_xLi_{(1/3-x/3)}Mn_{(2/3-2x/3)}]O_2$, K. Numata et al. have investigated mainly the composition region 0.7<X<1, where Co is filled to most of all the transition metal locations, but did not investigated 0.05<X<0.5 composition region. Also, the oxides were synthesized by a solid phase reaction using the carbonate source at temperature of 900~1,000° C. However, due to the difficulty of the synthetic reaction, an excessive amount of lithium oxide was added. In this way, the synthetic reaction was possible but this method has difficulty in controlling the particle size and requires a large amount of lithium oxide. Also, the discharge capacity of the manufactured cathode material powder in the region of 0.7<X<1 can not be achieved beyond the range of 130~140 mAh/g which is not bigger than that of the $LiCoO_2$.

SUMMARY OF THE INVENTION

The present invention provides lithium-cobalt-manganese oxides for the lithium secondary batteries having a stable structure and a superior discharge capacity.

The present invention also provides a method of synthesizing lithium-cobalt-manganese oxides for the lithium secondary batteries having low production cost, a simple synthesizing process, a stable structure, and a superior discharging capacity. In accordance with an aspect of the present invention, there is provided the lithium-cobalt-manganese oxides for lithium secondary batteries having a very fine and stable layered structure having the formula $Li[Co_xLi_{(1/3-x/3)}Mn_{(2/3-2x/3)}]O2(0.05<X<0.9)$.

In these lithium-cobalt-manganese oxides formed according to the embodiments of the present invention, the positive metal ions are intermixed locating uniformly on a desired position. Therefore, they are structurally very stable and good for the cathode materials for the lithium secondary batteries having a superior electrochemical characteristic.

In accordance with another aspect of the present invention, there is provided a manufacturing method of the lithium-cobalt-manganese oxide for lithium secondary batteries according to the present invention that an aqueous solution of lithium salt, cobalt salt, and manganese salt are prepared. Preferably, the lithium salt, cobalt salt, and manganese salt are water soluble salts. More preferably, the lithium salt is a lithium acetate dehydrate ($CH_3CO_2Li.2H_2O$), lithium nitrate ($LiNO_3$), or the mixture of these two, the cobalt salt is a cobalt nitrate hexahydrate ($Co(NH_3)_2.6H_2O$), and the manganese salt is a manganese acetate tetrahydrate (($CH_3CO_2)_2Mn.4H_2O$).

Above aqueous solution is heated to form a gel. The gel is burnt to form an oxide powder. By means of heat treatment, above oxide powder is transformed to form the formula $Li[Co_xLi_{(1/3-x/3)}Mn_{(2/3-2x/3)}]O_2$ (0.05<X<0.9) having a layered structure. The heat treatment steps for above oxide powder comprises the first heat treatment step of the oxide powder at the first temperature selected in the range of 400~500° C., and the second heat treatment step of the oxide powder at the second temperature which is higher temperature than the first temperature. Preferably, the second temperature is selected between 700–1,100° C.

According to the preferred embodiment of the present invention, a lithium-cobalt-manganese oxide for the cathode material of the lithium secondary battery can be obtained by a simple and inexpensive method including the repetition of heating and grinding processes. The lithium-cobalt-manganese oxide formed according to the present invention has a very fine and sable layered structure, and provides a high discharge capacity and superior electrochemical characteristic.

DETAILED DESCRIPTION OF THE INVENTION

Figure 1:
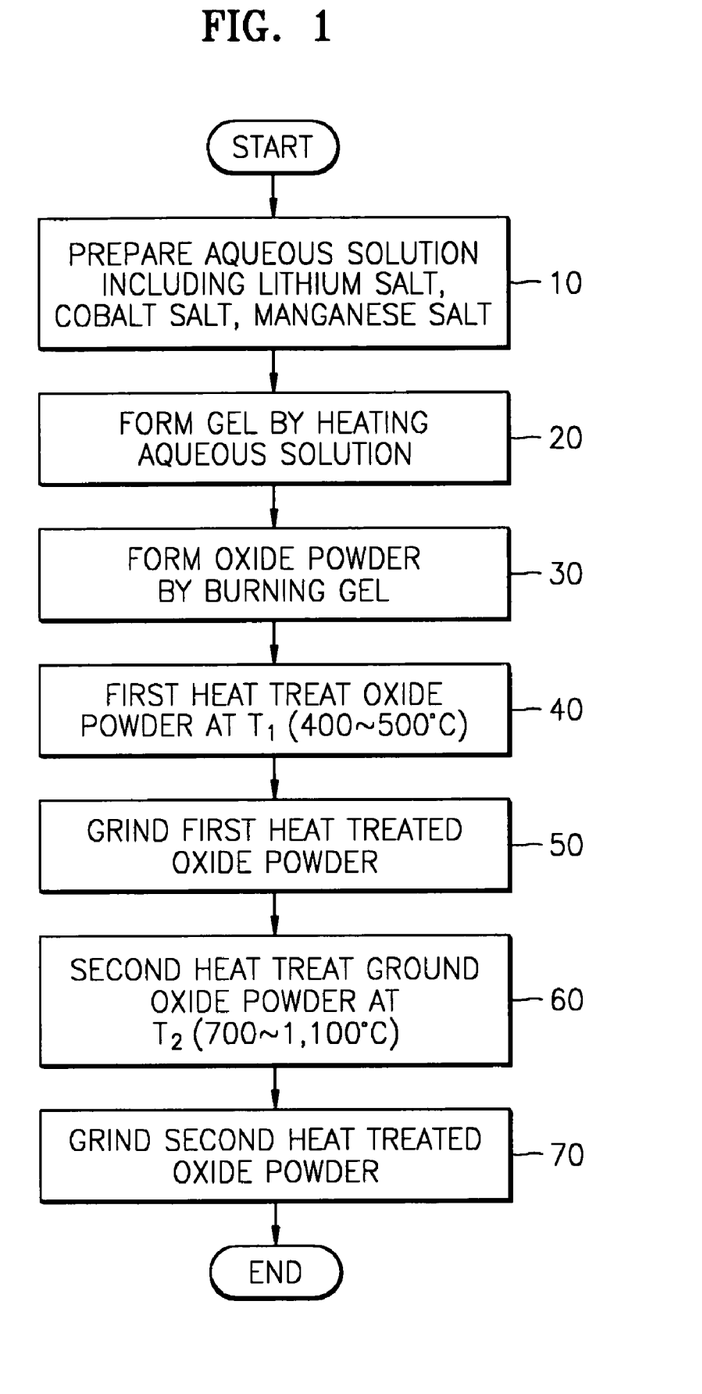
FIG. 1 is a flowchart showing a method of manufacturing lithium-cobalt-manganese oxides for the lithium secondary battery according to the present invention.

FIG. 1 is a flowchart showing a synthesizing method of lithium-cobalt-manganese oxides for the lithium secondary batteries according to the present invention.

Referring to FIG. 1, an aqueous solution is prepared by diluting the lithium salt, cobalt salt, and manganese salt in the distilled water with a predetermined composition (Step 10).

Above lithium salt, cobalt salt, and manganese salt are water soluble salts. The lithium salt is preferably lithium acetate dehydrate ($CH_3CO_2Li.2H_2O$), lithium nitrate ($LiNO_3$), or the mixture of these two. However, more preferably, the mixture of the lithium acetate dehydrate ($CH_3CO_2Li.2H_2O$) and lithium nitrate ($LiNO_3$) is used. Also, preferably, the cobalt salt is cobalt nitrate hexahydrate ($Co(NH_3)_2.6H_2O$), and the manganese salt is manganese acetate tetrahydrate (($CH_3CO_2$) $2Mn.4H_2O$).

According to the present invention, above lithium salt, cobalt salt, and manganese salt are exemplary, and not limited to these preferred embodiments. Therefore, it will be understood that various other water soluble the salts can be used for the purpose of the present invention. Here, the composition ratio of the oxide to be formed is controlled to have $Li[Co_xLi_{(1/3-x/3)}Mn_{(2/3-2x/3)}]O_2$ (0.05<X<0.9) under the assumption of oxidation state that Li is 1+, Co is 3+, and Mn is 4+. If the X value is below 0.05, the oxide can not be used for the cathode material of the lithium secondary batteries due to the relatively small discharge capacity, and if the X value is greater than 0.9, the structure becomes weak when it is recharged at a high voltage.

Afterwards, by means of heating the aqueous solution containing the lithium salt, cobalt salt, and manganese salt so as to form a gel (Step 20). More specifically, the moisture of the aqueous solution is removed by heating. The heating temperature at this time is higher than 100° C. but an excessively high temperature is undesirable because of energy waste. If the moisture removal is completed, the aqueous solution becomes a violet colored gel having a very high viscosity.

Next, above gel is burnt by heating so as to form an oxide powder (Step 30). On heating the gel, residual moisture is removed and commences burning with ignition by the action of the acetate radical (—COOH) and the nitrate radical (—$NO_3$) contained in the gel. The heating temperature for burning is high enough if it can make ignition. Preferably, it is heated about 400~500° C. While burning process, lumps of the gel swell by the generated gas. The swelled lumps are ground to form a fine oxide powder.

The fine oxide powder obtained is first heat treated at the first temperature $T_1$ (Step 40) so as to complete the reaction if there is any incomplete reaction. Preferably, the first temperature $T_1$ is 400~500° C. The first heat-treated powder is then reground (Step 50).

The ground powder is second heat treated at a temperature $T_2$ which is a higher temperature than the first temperature $T_1$ (Step 60). Here, preferably the second temperature $T_2$ is 700~1,100° C. The second heat-treated oxide powder is reground (Step 70). Consequently, a desired, a very fine layered structure of a lithium-cobalt-manganese oxide is formed.

When, the second heat treatment temperature is below 700° C., the phase formation is not well matured, and if the temperature exceeds 1,100° C., the oxide formed has a low discharge capacity, therefore, both cases are undesirable. Preferably, the period for the second heat treatment is about 1~24 hours. If the second heat treatment is too short, a complete reaction may not occur. On the contrary, if it is too long, an excessive reaction may occur, which results in the reduction of discharge capacity when it is used as the cathode material for the secondary batteries. The second heat treatment time can be adjusted suitably depending on the reaction temperature.

Hereinafter, the synthesizing method of the lithium-cobalt-manganese oxides according to the practical embodiments of the present invention will be described.

EXAMPLE 1~6

Stoichiometric amount of lithium acetate dehydrate ($CH_3CO_2Li\cdot2H_2O$), lithium nitrate ($LiNO_3$), manganese acetate tetrahydrate (($CH_3CO_2)_2Mn\cdot4H_2O$), and cobalt nitrate hexahydrate ($Co(NO_3)_2\cdot6H_2O$) were dissolved in distilled water. The relative amount of above reagents is shown in table 1.

TABLE 1

| No. | Composition | $Co(NO_3)_2.6H_2O$ | $(CH_3CO_2)_2Mn.4H_2O$ | $CH_3CO_2Li \cdot H_2O$ | $LiNO_3$ |
|---|---|---|---|---|---|
| 1 | Li $[Co_{0.50}Li_{0.17}Mn_{0.33}]$ $O_2$ | 43.65 g | 24.51 g | 35.71 g | — |
| 2 | Li $[Co_{0.33}Li_{0.22}Mn_{0.45}]$ $O_2$ | 26.19 g | 29.40 g | 26.53 g | 4.83 g |
| 3 | Li $[Co_{0.25}Li_{0.25}Mn_{0.50}]$ $O_2$ | 17.46 g | 29.40 g | 20.40 g | 6.89 g |
| 4 | Li $[Co_{0.20}Li_{0.27}Mn_{0.53}]$ $O_2$ | 17.46 g | 39.21 g | 23.46 g | 10.34 g |
| 5 | Li $[Co_{0.17}Li_{0.28}Mn_{0.55}]$ $O_2$ | 17.46 g | 49.02 g | 26.52 g | 13.79 g |
| 6 | Li $[Co_{0.10}Li_{0.30}Mn_{0.60}]$ $O_2$ | 8.73 g | 44.12 g | 18.36 g | 14.48 g |

The mass of each reagent taken as indicated in table 1 was dissolved in distilled water of 100~150 ml, and heated at 150° C. under stirring. As the result, a transparent aqueous solution with a violet color was obtained.

Above aqueous solution was heated until a gel having a very high viscosity is obtained. The obtained gel was burnt at 400° C. to remove the organic materials and remaining moisture in the gel, and swelled lump was obtained. This lump was ground to a form fine particle of oxide powder. Afterwards, this powder was burnt at 500° C. for 3 hours as the first heat treatment, and ground. Finally, the powder was sintered at 1,000° C. for 6 hours as the second heat treatment, and it was obtained a desired oxide powder having a very fine layered structure by grinding the sintered material.

Figure 2:
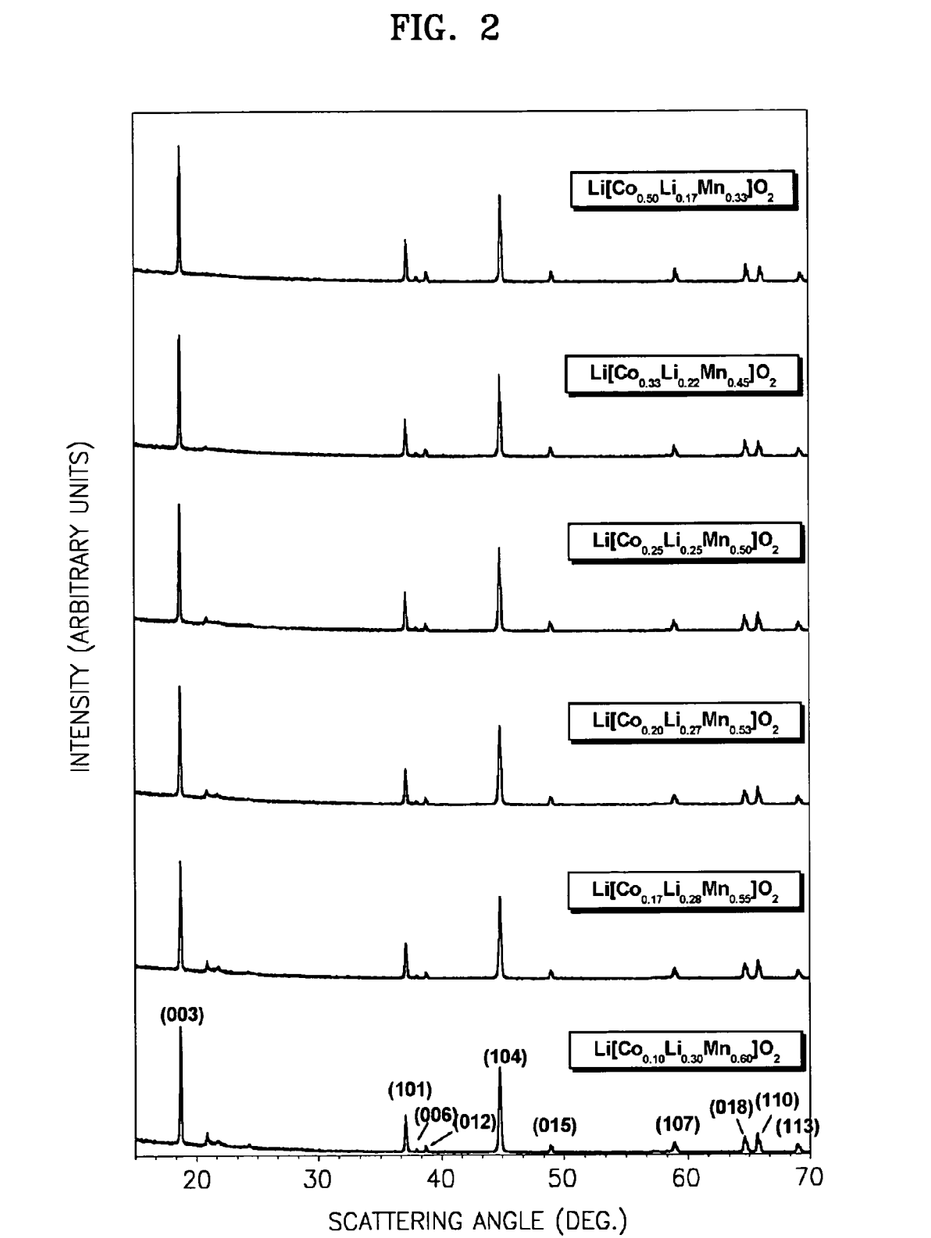
FIG. 2 is a power XRD (X-ray diffraction) pattern of lithium-cobalt-manganese oxides synthesized according to the present invention.
Figure 3A:
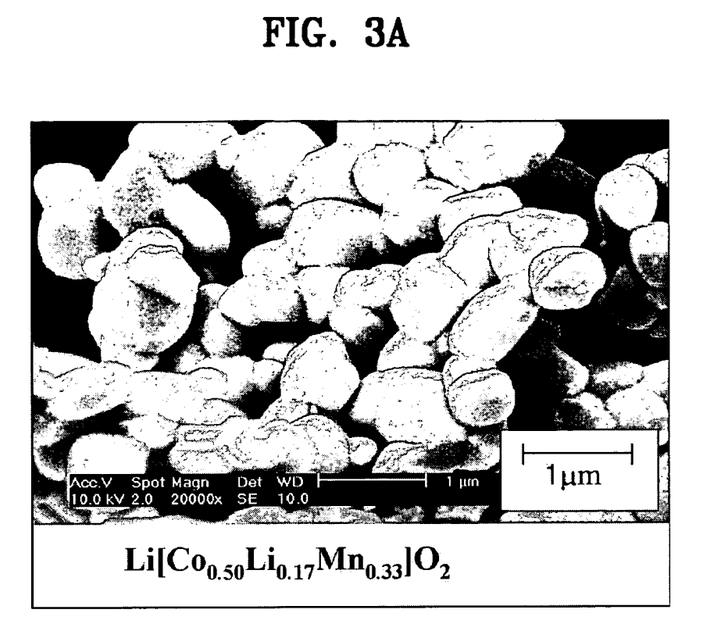
FIGS. 3A through 3F are SEM images of lithium-cobalt-manganese oxides synthesized according to the present invention, respectively.
Figure 3B:
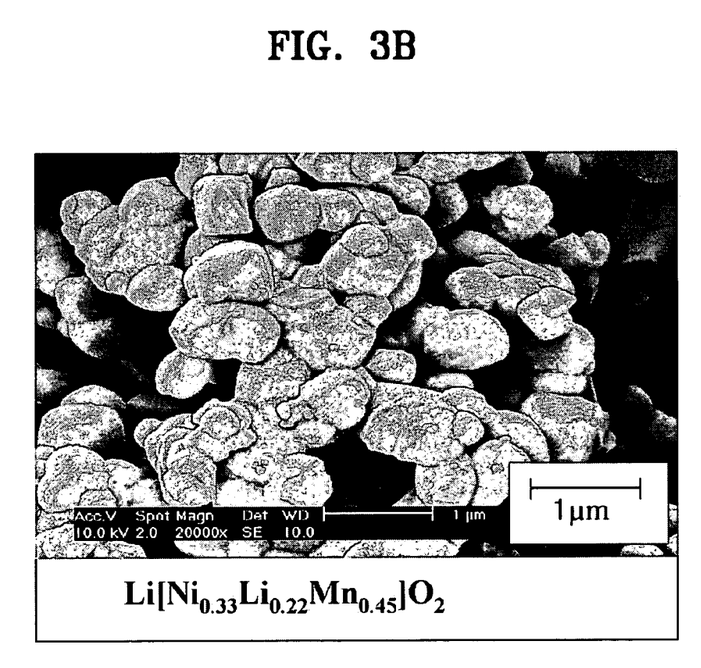
Figure 3C:
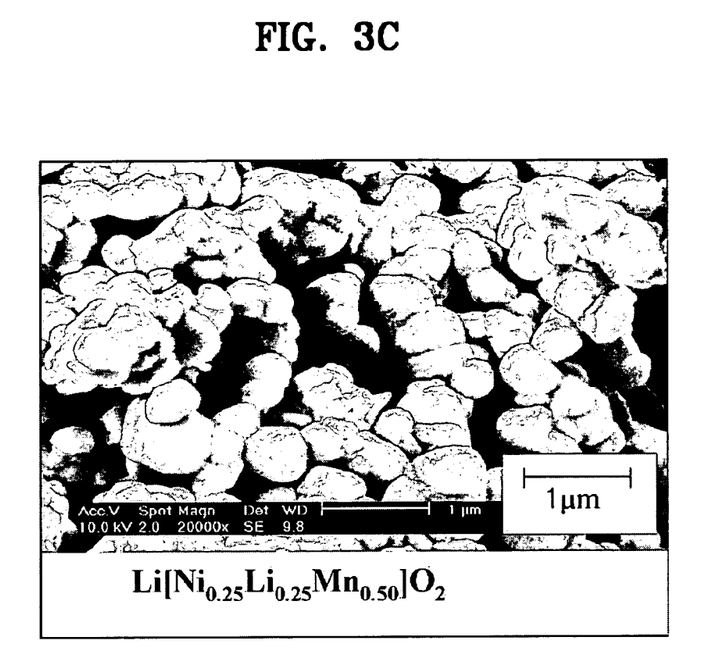
Figure 3D:
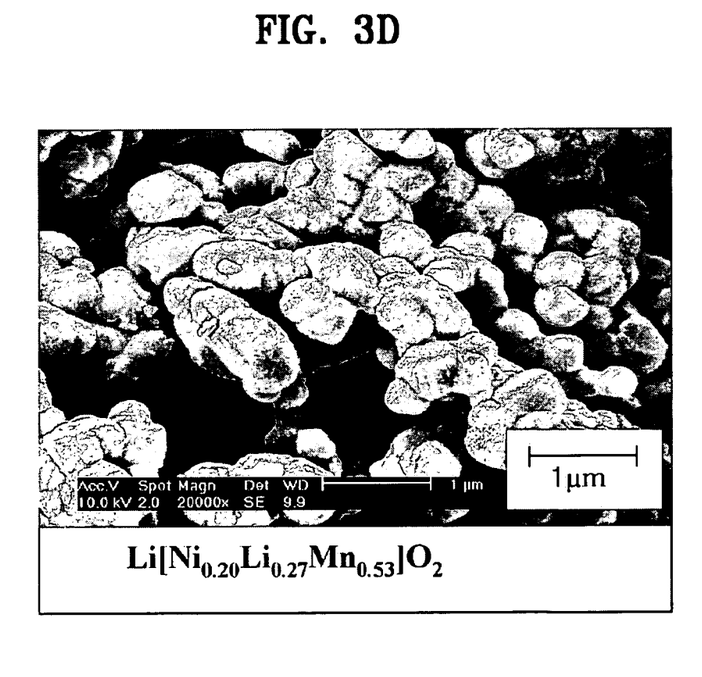
Figure 3E:
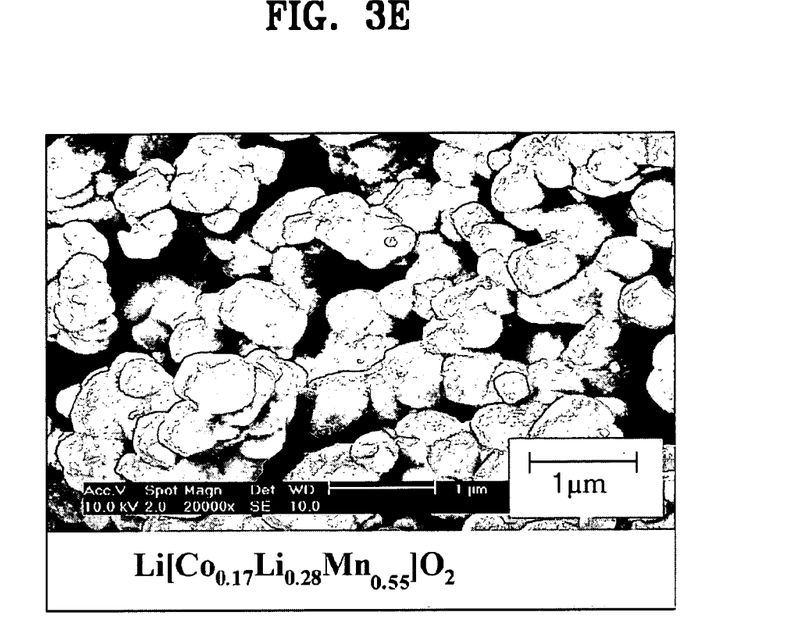
Figure 3F:
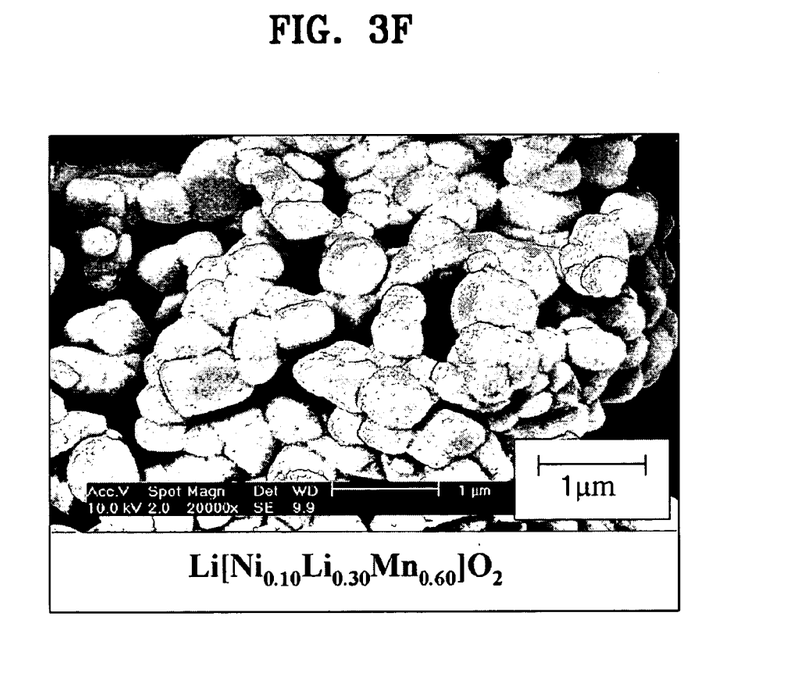

FIG. 2 is a power XRD (X-ray diffraction) pattern of lithium-cobalt-manganese oxides synthesized according to the first through sixth embodiments of the present invention. The analysis results of the diffraction patterns in FIG. 2 reveal that oxides having a layered structure are formed.

FIGS. 3A through 3F are SEM images of lithium-cobalt-manganese oxides synthesized according to the first through sixth embodiments of the present invention, respectively. In those images 3A through 3F, it is observed that each oxide is a very fine particle of sized less than 1 $\mu$m having a round shape powder.

Figure 4A:
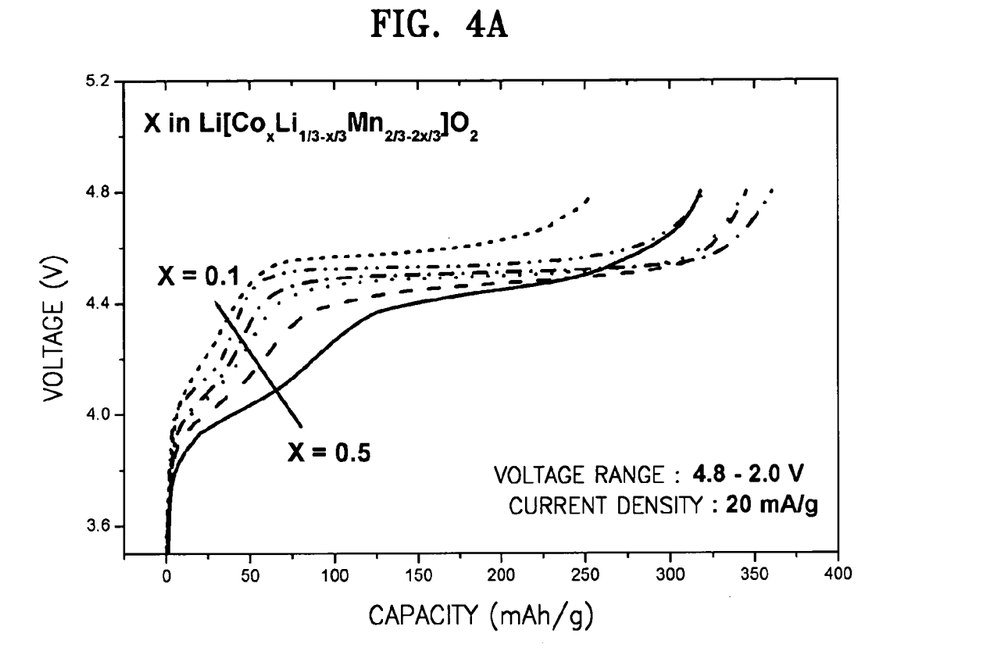
FIGS. 4A and 4B are showing the initial charge and discharge characteristic of lithium-cobalt-manganese oxides synthesized according to the present invention, respectively.
Figure 4B:
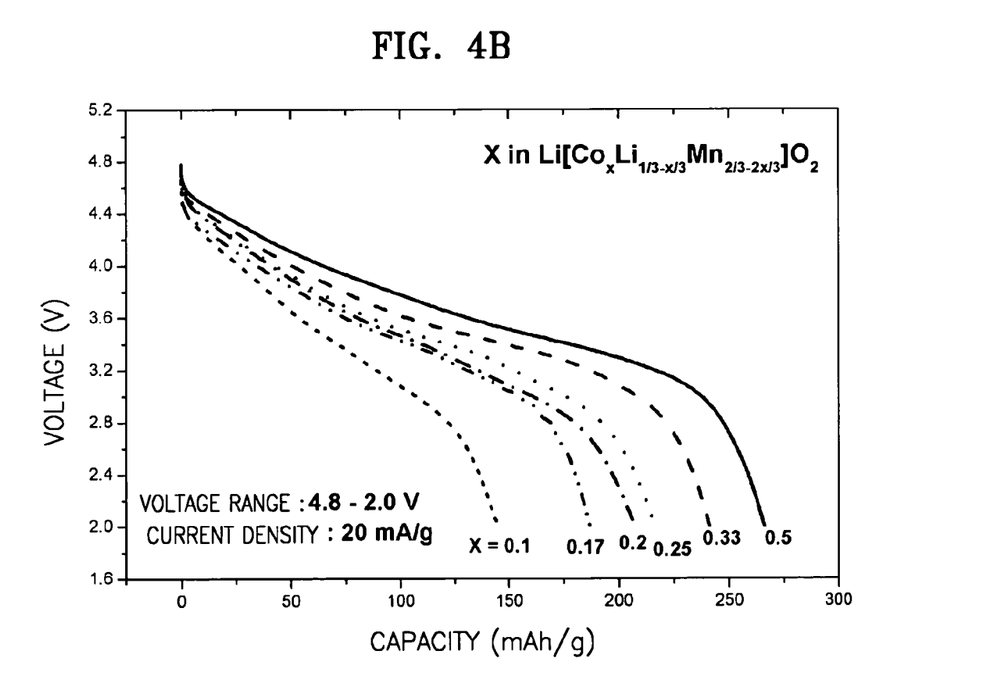

In order to verify the performance of the lithium-cobalt-manganese oxides synthesized according to the present invention, the measurements regarding the initial charge/discharge characteristics of each oxide obtained from the first through sixth examples were carried out, and the results are showed in FIGS. 4A through 4B. For this characteristic measurement, each oxide powder synthesized according to the first through sixth example was mixed with an conducting material and a binder in a ratio of 80:12:8% by weight, respectively, and the cathodes of each oxide were made. The electrolyte was 1M of lithium hexafluoro phosphate salt ($LiPF_6$) in a 1:1 mixture of ethylene carbonate (EC): dimethyl carbonate (DMC) solvents. A lithium foil was used as anodes.

The initial charge capacities of the lithium-cobalt-manganese oxides synthesized according to the first through sixth examples, when charged to 4.8 volts and discharged to 2.0 volts applying a current density 20 mA/g, are distributed in the range of 150~270 mAh/g depending on the composition as depicted in FIGS. 4A and 4B. This specific capacity is much higher value than other cathode materials for the secondary batteries. Accordingly, the lithium-cobalt-manganese oxides synthesized according to the present invention for the cathode material for the secondary batteries can provide high capacity lithium secondary batteries.

Figure 5:
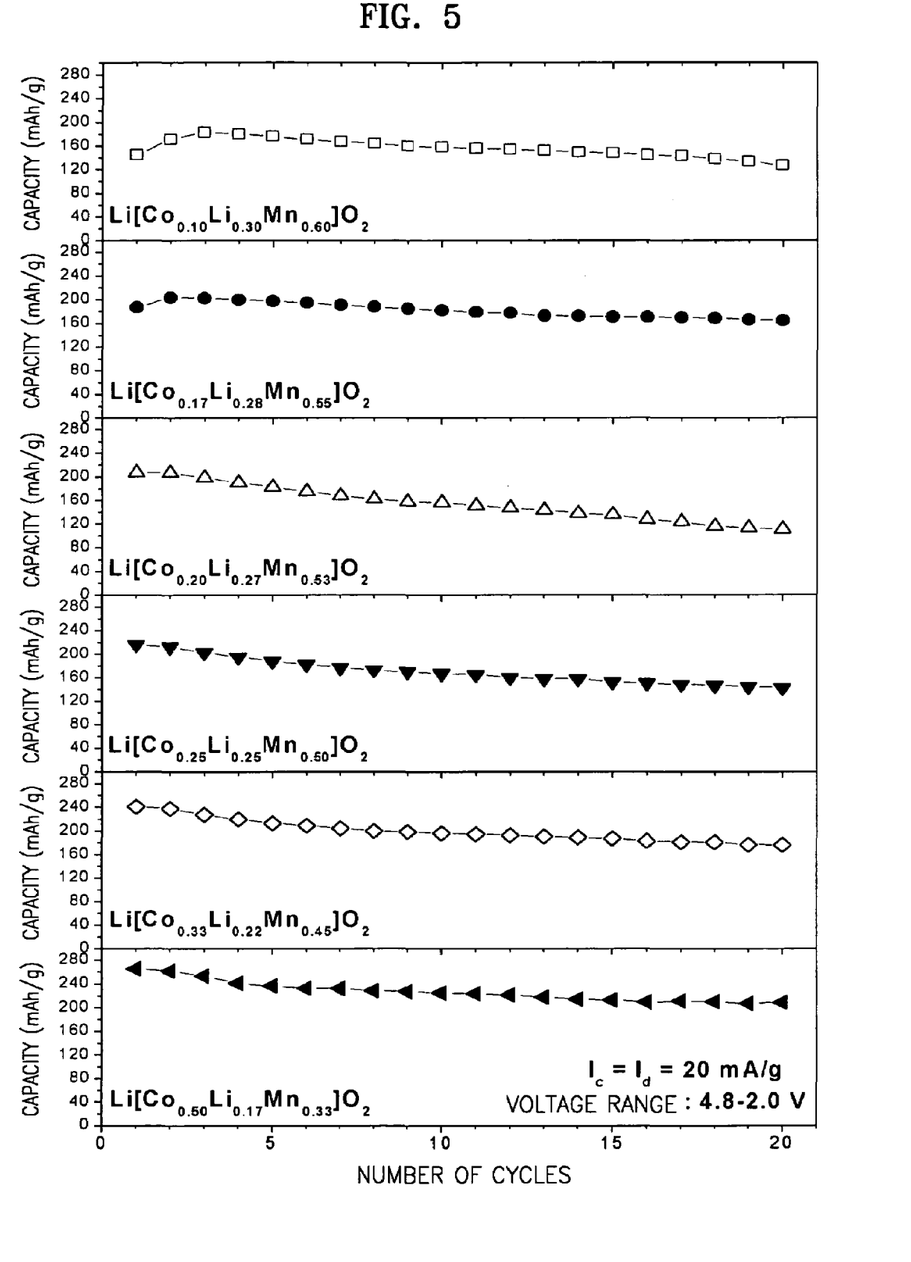
FIG. 5 is a cycling behavior of lithium-cobalt-manganese oxides synthesized according to the present invention.

FIG. 5 is a cycling behavior of lithium-cobalt-manganese oxides synthesized according to the first through sixth examples of the present invention. The tests were conducted charging to 4.8 volts and discharging to 2.0 volts under applying a current density 20 mA/g, and showed that the cycle performances are relatively in stable states.

According to the present invention, the method of synthesizing the lithium-cobalt-manganese oxides for the lithium secondary batteries comprises of; a formation a gel from an aqueous solution of lithium salt, cobalt salt, and manganese salt dissolved in distilled water; burning the gel to form a fine oxide powder; double heat treatment of the oxide powder. Then, a fine lithium-cobalt-manganese oxide powder having a stable layered structure is obtained.

According to the present invention, a lithium-cobalt-manganese oxide having a stable layered structure, and having a compound composition ratio of $Li[Co_xLi_{(1/3-x/3)}Mn_{(2/3-2x/3)}]O_2$ (0.05<X<0.9) is obtained by virtue of the positive metal ions positioning uniformly in the desired locations in the compound by means of a relatively simple heat treatment. Also, the synthesizing process of the lithium-cobalt-manganese oxide is very simple and requires low cost, thus, suitable for mass production. Also, the lithium-cobalt-manganese oxide, which is a very fine oxide powder formed by the vapor generated in the course of heating the gel, can provide a high discharge capacity and has a stable structure compared to the oxides obtained by the solid phase reaction. Therefore, the use of oxides formed according to the present invention for the cathode material for the lithium secondary batteries, a superior electrochemical characteristic of the lithium secondary batteries can be obtained.

While this invention has been particularly shown and described with reference to a preferred embodiment thereof, it will be understood by those skilled in the art that various changes in form and details may be made therein without departing from the sprit and scope of the invention as defined by the appended claims.

What is claimed is:

1. A method of synthesizing a lithium-cobalt-manganese oxide for secondary batteries, the method comprising:
   preparing an aqueous solution of lithium salt, cobalt salt, and manganese salt;
   forming a gel by heating the aqueous solution;
   burning the gel to generate an oxide powder; and
   forming an oxide powder having a layered structure and a compound composition of $Li[Co_xLi_{(1/3-x/3)}Mn_{(2/3-2x/3)}]O_2$ (0.05<X<0.9) by heat treating the oxide powder.

2. The method of claim 1, wherein the lithium salt, cobalt salt, and manganese salt are water soluble salts.

3. The method of claim 1, wherein the lithium salt is lithium acetate dehydrate ($CH_3CO_2Li \cdot 2H_2O$), lithium nitrate ($LiNO_3$), or a mixture of these salts.

4. The method of claim 1, wherein the cobalt salt is cobalt nitrate hexahydrate ($Co(NH_3)_2 \cdot 6H_2O$).

5. The method of claim 1, wherein the manganese salt is manganese acetate tetrahydrate ($(CH_3CO_2)_2Mn \cdot 4H_2O$).

6. The method of claim 1, wherein the gel is burnt at a temperature range of 400–500° C.

7. The method of claim 1, wherein the burning the oxide powder comprises:
   a first heat treatment of the powder at a first temperature at a range of 400~500° C.; and
   a second heat treatment of the first heat treated powder at a second temperature which is a higher temperature than the first temperature.

8. The method of claim 7, wherein the second temperature is at a range of 700~1,100° C.

9. The method of claim 7, wherein the method further comprises:
   grinding the first heat treated powder; and
   grinding the second heat treated powder.

10. Lithium-cobalt-manganese oxide having the formula $Li[Co_xLi_{(1/3-x/3)}Mn_{(2/3-2x/3)}]O_2$ (0.05X0.9) is synthesized by a method according to one of claims 1–9.

* * * * *